D. NOBLE.
POWER TRANSMITTING MECHANISM.
APPLICATION FILED JULY 30, 1914.
1,235,837.
Patented Aug. 7, 1917.
4 SHEETS—SHEET 1.
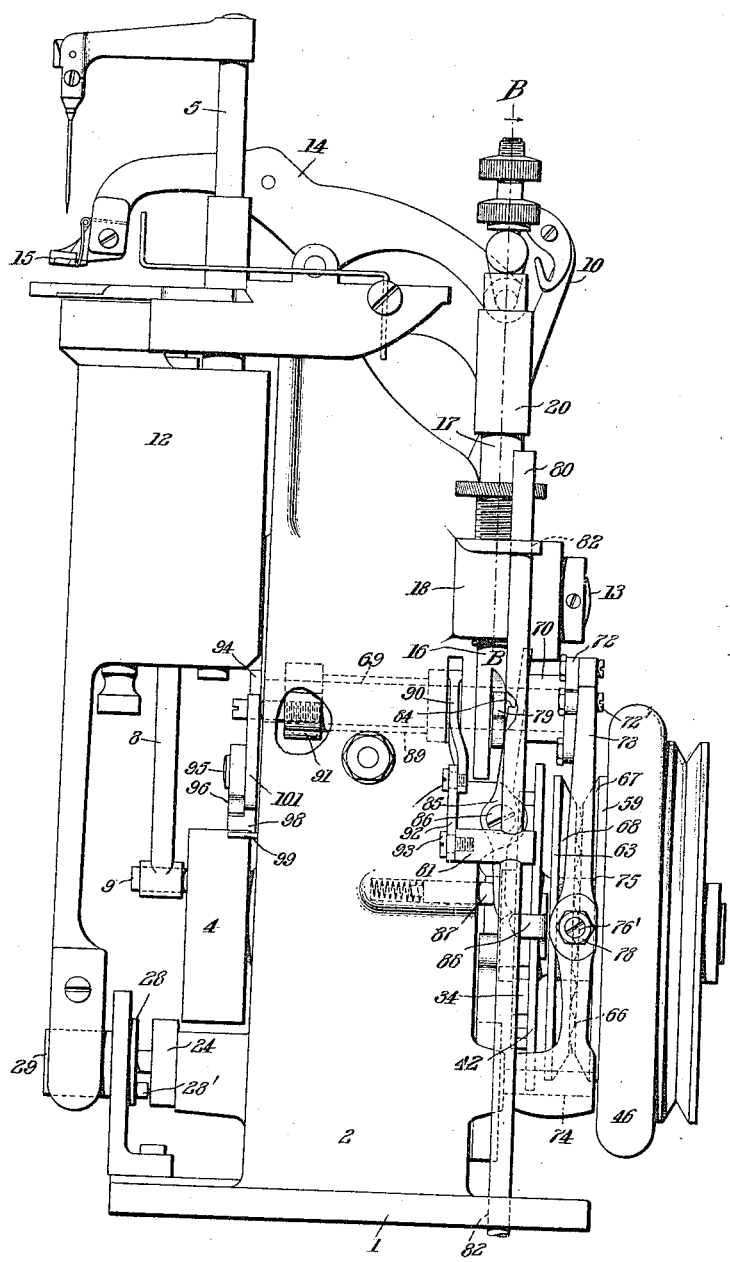
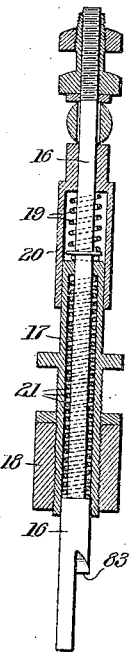
WITNESSES:
L. E. Fischer
H. L. Fischer
INVENTOR
Donald Noble.
BY
F. W. Ostrom.
ATTORNEY

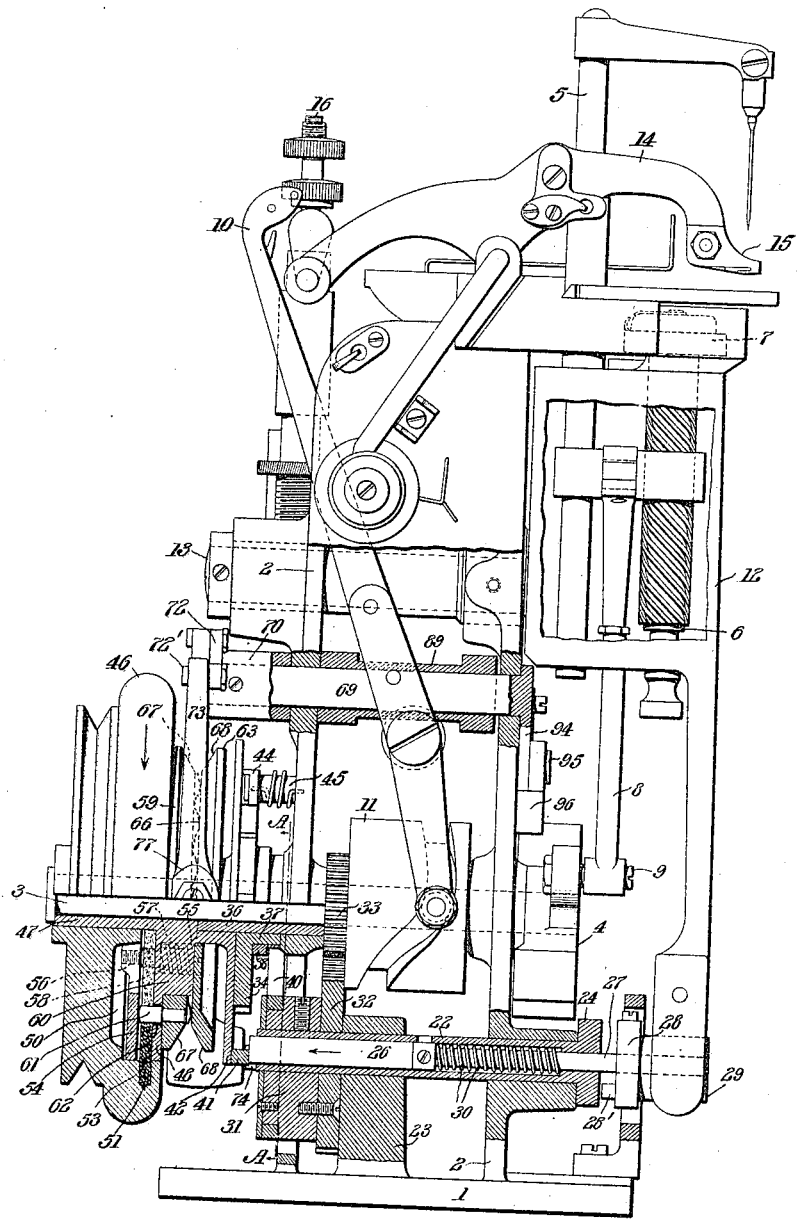

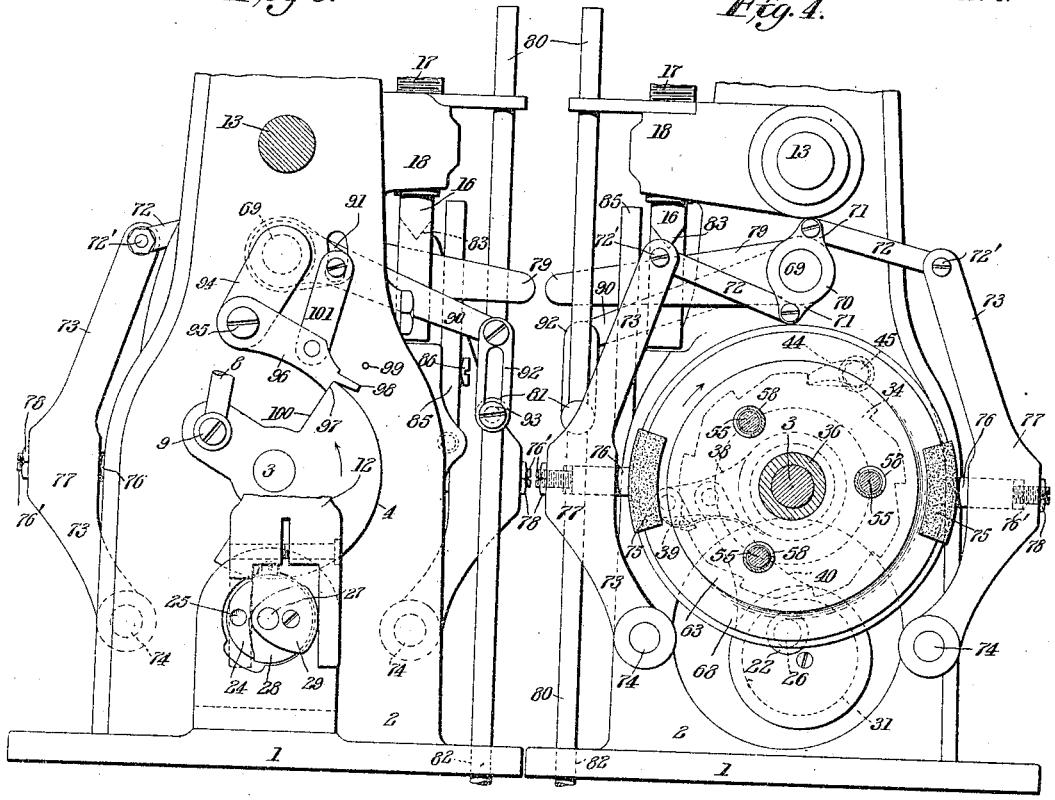

D. NOBLE.
POWER TRANSMITTING MECHANISM.
APPLICATION FILED JULY 30, 1914.
1,235,837.
Patented Aug. 7, 1917.
4 SHEETS—SHEET 4.
Fig. 6.
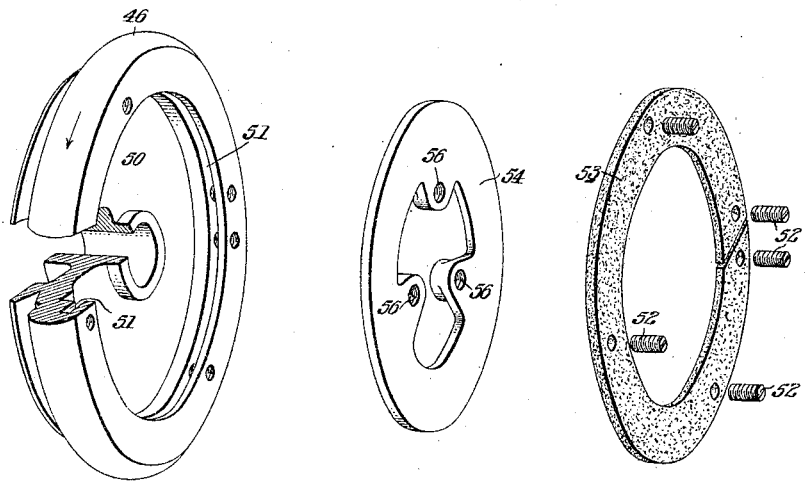
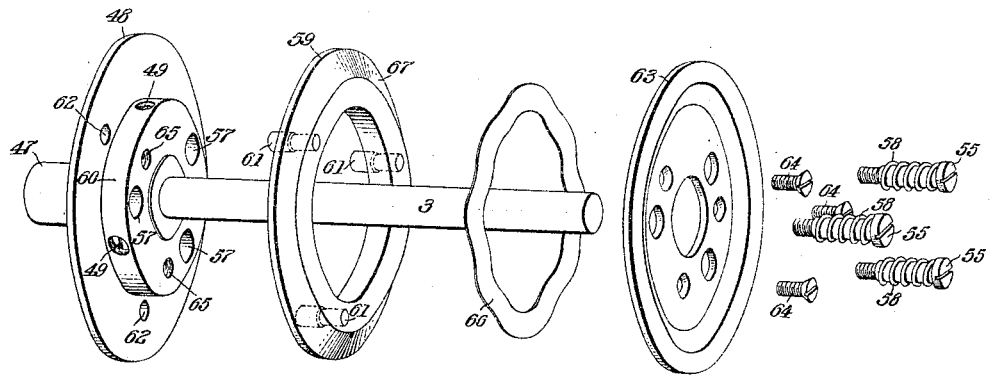
WITNESSES:
L. E. Fischer
G. L. Fischer
INVENTOR
Donald Noble.
BY F. W. Ostrom
ATTORNEY

UNITED STATES PATENT OFFICE.

DONALD NOBLE, OF BRIDGEPORT, CONNECTICUT, ASSIGNOR TO THE SINGER MANUFACTURING COMPANY, A CORPORATION OF NEW JERSEY.

POWER-TRANSMITTING MECHANISM.

1,235,837.   Specification of Letters Patent.   Patented Aug. 7, 1917.

Application filed July 30, 1914. Serial No. 854,012.

*To all whom it may concern:*

Be it known that I, DONALD NOBLE, a citizen of the United States, residing at Bridgeport, in the county of Fairfield and State of Connecticut, have invented certain new and useful Improvements in Power-Transmitting Mechanisms, of which the following is a specification, reference being had therein to the accompanying drawings.

This invention relates to improvements in power transmitters of the stop-motion mechanism type, such forms of constructions as are adapted more particularly for use in connection with the operating of sewing machines controlled to stitch a predetermined design or figure, and has for its object to improve the construction represented by my United States Patent No. 656,853, dated August 28, 1900, its primary object being to make more convenient and positive of control the means for discontinuing the transmission of power.

In the earlier constructions it has been the common practice to employ a yieldingly mounted brake element controlled to act on a single power transmitting element to arrest the transmission of power, the present construction being differentiated from such earlier constructions by the employment of elements arranged to form a divided V-shaped groove, in connection with oppositely arranged wedge-shaped brake elements which act on the walls of said groove to more accurately determine the position of rest of the driving elements under conditions of variable speed, and without any change in the relative adjustments of the power transmitting elements.

To better adapt the present power transmitting mechanism to extreme variations of speed, as when operating sewing machines from a source of power not fully adequate to the requirements, often due to the occasional operating of heavily loaded elevators common to the requirements of power transmission in many factories, there is provided an auxiliary brake-shoe controlling mechanism, the brake-action of which follows the brake action of the brake-shoes and determines that the machine, under extreme variations of speed, will be brought to rest with the needle in a predetermined position with respect to its vertical movements.

Referring to the drawings, Figure 1 is a view in side elevation of a Singer button sewing machine equipped with the present invention. Fig. 2 a side elevation, partly in section, opposite to that shown in side elevation in Fig. 1. Fig. 3 a front side elevation of a portion of the sewing machine frame, together with certain elements of the power transmitting mechanism later to be referred to. Fig. 4 a rear side elevation of a portion of the sewing machine frame showing the main-shaft in section and in full lines the power transmitting mechanism located forward of the main-shaft driving elements, shown in Fig. 6. Fig. 5 a cross section on the line A—A, Fig. 2. Fig. 6 detail views, in perspective, of the driving elements mounted on the rear end of the main-shaft. Fig. 7 a view in central section on the line B—B, Fig. 1.

The present invention is shown as applied to a Singer button sewing machine, the same as is represented by my United States patent application Serial No. 854,011 filed July 30, 1914, but as it relates only to the construction and application of the power transmitting mechanism, only such reference will be made to the other elements of the machine as is deemed necessary for a proper understanding of its application.

Referring to the drawings, 1 represents a frame base upon which is mounted the vertically arranged frame 2; 3 the main-shaft suitably journaled in the frame 2 and at its forward end provided with a suitably secured shaft flange 4, which latter is operatively connected with the needle carrying bar 5 and loop-taker shaft 6, the latter provided with the loop-taker 7 shown in dotted lines only Fig. 2, by a two part connection 8 and wrist-pin 9, 10 the needle thread take-up operated from the cam 11 carried by said main-shaft, 12 a vertically arranged oscillating frame into which said needle, loop-taker and loop-taker shaft are mounted, said oscillating frame being carried by a shaft 13 suitably journaled in the frame 2.

14 represents a button clamp rock-arm carrying at its free end a button clamp 15 and at its opposite end pivotally connected to a vertically movable rod 16 mounted in the bushing 17 threaded into a lug 18 forming a part of the sewing machine frame, the spring 19, housed in the tubular sleeve 20, acting to resiliently hold the clamp 15 down upon the material being acted on when, through the starting of the machine, the brake-spring 21 housed in the bushing 17 is compressed by the upward movement of said rod, as will later be explained.

22 represents a frame rocking shaft journaled at one end in a suitable bearing in the frame 2 and at its opposite end in the lug 23 extending up from the base 1, said shaft carrying at its forward end a flange 24 provided with an opening 25. 26 denotes a cam-shaft mounted to move endwise in the shaft 22 and having a reduced portion 27 which at its outer end carries a suitably secured flange 28, provided with a pin 28', and triangular cam 29, a spring 30 mounted on said reduced portion normally acting to hold the shaft 26 in the direction indicated by the arrow thereon.

To the inner end of the shaft 22 is suitably secured an eccentric 31, and mounted on said shaft and suitably secured to said eccentric is a gear-member 32 which meshes with the gear-member 33 carried by the main-shaft, said gear members being of the ratio of two to one, thus giving to the shaft 22 one rotation to two rotations of the main-shaft. 34 denotes a ratchet-disk provided with ratchet-teeth, as 35, and mounted to turn on the bushing 36 concentric with but in a direction opposite to that of the main-shaft 3, and upon the hub 37 of said ratchet-disk is journaled a pawl carrying lever 38 provided with a spring controlled pawl 39, the arm 38 being operatively connected with the eccentric 31 by the eccentric connection 40. 41 denotes a cam-bracket, suitably secured to a cam-disk 42 carried by the ratchet-disk 34, and provided with an inclined or cam portion 43. 44 denotes a spring controlled retaining pawl mounted on a stud 45 secured in the frame 2.

Supposing the stitch-forming and stitch positioning elements to be in their positions of rest as illustrated in Figs. 1 to 4 inclusive, an upward movement of the rod 16, through means later to be described, would position the clamp down upon the material, and such adjustment of the rod would, through the power-transmitting elements later to be referred to, bring into action the stitch-forming and stitch positioning elements with the result, that first, superposed single or tying stitches would be formed owing to the inner end of the shaft 26 being in contact with the cam-bracket 41, which is the position of rest of the cam-disk 42, and the pin 28' out of engagement with the opening 25 in the flange 24, which is the idle position of the triangular cam 29. As the cam-bracket 41 passes out of engagement with the end of the shaft 26 the pin 28' engages the opening 25 which causes the cam 29 to oscillate the frame 12, thus effecting the superposed button securing stitches when, in the further rotation of the disk 42, the incline 43 of the cam-bracket 41 is brought into engagement with the end of the shaft 26 to form tying stitches at the completion of the cycle of stitch formation, and when the cam-bracket 41 has passed the end of the shaft 26 for the greater portion of its length the power-transmitting mechanism arrests the action of the machine by means now to be described, and which forms the subject matter of the present invention.

46 represents a hand-wheel or band-pulley loosely mounted on the hub 47 of the driving disk 48 secured by screws, as 49, upon the main-shaft 3 and at its inner side cupped out as shown at 50, the inner portion of the outer rim of said hand-wheel being provided with a groove 51 into which is secured by screws, as 52 threaded into said rim, a friction or driving ring 53, preferably of leather. 54 denotes a driving flange secured by screws, as 55 threaded into the openings as 56, to turn with the disk 48 but having movements in the direction of the length of said main-shaft by the screws, as 55, passing loosely through the openings, as 57, formed in said driving disk, springs, as 58, acting to normally hold said driving flange in driving relationship with said driving ring and driving disk, as when operating the machine.

59 represents a brake-flange loosely mounted on the inner hub 60 of the driving disk 48 and provided with pins, as 61, which pass loosely through the openings, as 62, formed in said driving disk, said pins being brought into engagement with the flange 54 when the flange 59 is actuated to arrest the action of the machine, as will later be explained. 63 denotes a second brake flange rigidly secured to the face of the hub 60 of the disk 48 by screws, as 64, threaded into the openings, as 65, the flange 59 being yieldingly held against accidental movement in the direction of the length of the main-shaft by an irregularly formed circular spring 66. The flanges 59 and 63 are provided with inclined brake surfaces 67 and 68 respectively.

69 represents a brake-shoe rock-shaft mounted in suitable bearings formed in the frame 2 and carrying at one end a sleeve 70 provided with oppositely arranged lugs, as 71, which have pivotally connected to them links, as 72. The opposite ends of the links 72 are pivotally connected by pivot screws, as 72', brake-levers, as 73, whose lower ends are pivoted upon suitable studs, as 74, secured in the frame 2, said levers being capable of movements in directions transverse to their length on said pivot-screws and provided with studs, as 76, carrying brake-shoes, as 75, the outer ends of said studs abutting the inner ends of the screws, as 76' threaded into bosses, as 77, formed integral with said levers, said screws being secured against accident movement by nuts, as 78. 79 denotes a brake actuating lever formed integral with the sleeve 70 which, when moved upward by an element later to be referred to, acts to move the brake-shoes 75 clear of the inclined brake surfaces 67 and 68 of the disks 59 and 63 respectively, as when starting the machine. 80 represents a treadle-rod whose lower end, in practice, is attached to a suitable foot-treadle (not shown) and on said rod is suitably secured an arm or lug 81, said rod being directed in its vertical movements by suitable bearings, as 82, (shown in dotted lines only). The upward movement of the rod 80 causes the lug 81 to raise the lever 79 into contact with the step 83 of the rod 16, thus closing down the clamp 15, compressing the brake-spring 21, rocking the shaft 69, releasing the brake-shoes 75 from engagement with the inclined brake-surfaces 67 and 68, thus permitting the springs 58 mounted on the screws 55 to force the flange 54 into driving relationship with the driving ring 53.

The lever 79 when elevated rests on the shoulder 84 of the catch-lever 85 pivoted on stud 86 threaded into the frame 2, said catch-lever being yieldingly held in engagement with the lever 79 by the spring controlled plunger 87 mounted in the frame 2 and bearing against the lower end of said catch-lever. The cycle of stitch-formation is determined by the cam-lug 88 carried by the cam-disk 42 contacting the lower end of the lever 85 and disconnecting the lever 79 from the shoulder 84, thus permitting the spring 21 to force the brake-shoe in contact with the inclined surfaces 67 and 68 and, through the pins 61 force the flange 54 out of driving engagement with the driving ring 53.

To better adapt the previously described power transmitting and arresting mechanism to extreme variations in speed there is employed an auxiliary brake-shoe actuating mechanism comprising the sleeve 89 loosely mounted on the brake-shoe rock-shaft 69 and provided with integrally formed arms 90 and 91, the arm 90 carrying at its outer end a link 92 slidably connected by screw 93 with the lug 81 carried by the treadle rod 80. 94 denotes a crank-arm formed integral with the shaft 69 and to its lower end is pivotally attached by screws 95 a brake-pawl 96 provided with a stop-wall 97 and finger 98, which latter during the stitching operation rests on the pin 99 secured in the frame 2, and when not so positioned occupies the position shown best in Fig. 3 with its wall 97 in engagement with the wall 100 of the shaft flange 4. 101 denotes a link pivotally attached at one end to the brake-pawl 96 and at its opposite end to the arm 91 carried by the sleeve 89, said link acting through the upward movement of the arm 90 to lift the pawl 96 out of engagement with the flange 4 when starting the machine.

It will be readily understood that the function of the auxiliary stop mechanism is to employ the momentum of the parts to assist the spring 21 in applying the brake members 75 to the inclined surfaces 67 and 68 after said brake elements have been in engagement with said inclined surfaces for a portion of a revolution of the latter.

Having thus set forth the nature of the invention, what I claim herein is:—

1. In a power transmitting and arresting mechanism, the combination with a rotary main-shaft, of oppositely arranged brake-shoes, means for actuating the latter and rotary brake-flanges mounted to rotate with said shaft and provided with inclined brake-surfaces with which said brake-shoes coact to arrest the transmission of power, together with an auxiliary brake-shoe controlling mechanism whose brake action is applied to the brake-shoes subsequent to the action of the latter on said inclined surfaces.

2. In a power transmitting and arresting mechanism, the combination with a main-shaft rotating unidirectionally, of means for rotating said shaft at the will of the operator and for automatically arresting the action of said shaft including oppositely arranged brake-shoes, means for actuating the latter and separately mounted rotary brake-flanges mounted concentric with the main-shaft and provided with inclined brake-surfaces with which said brake-shoes coact to arrest the transmission of power.

3. In a power transmitting and arresting mechanism, the combination with a rotary main-shaft, of means for rotating said shaft at the will of the operator and for automatically arresting the action of said shaft including oppositely arranged brake-shoes, means for actuating the latter, rotary brake-flanges mounted concentric with the main-shaft and provided with inclined brake-surfaces with which said brake-shoes coact to arrest the transmission of power, and an auxiliary brake-shoe controlling mechanism whose brake action is applied to the brake-shoes subsequent to the action of the latter on said inclined surfaces.

4. In a power transmitting and arresting mechanism, the combination with a main-shaft, rotating unidirectionally, of means for rotating said shaft at the will of the operator and for automatically arresting the action of said shaft including oppositely arranged brake-shoes having movements in transverse directions, means for actuating the latter and separately mounted rotary brake-flanges mounted concentric with the main-shaft and provided with inclined brake-surfaces with which said brake-shoes coact to arrest the transmission of power.

5. In a power transmitting and arresting mechanism, the combination with a main-shaft rotating unidirectionally, of means for rotating said shaft at the will of the operator and for automatically arresting the action of said shaft including oppositely arranged brake-shoes, means for actuating the latter, a rotary brake-flange provided with an inclined brake surface and mounted to rotate with said shaft in a given path only, a second brake-flange provided with an inclined brake-surface and controlled to rotate with the main-shaft in different paths, said brake-shoe actuating means being automatically controlled to force said brake-shoes into contact with said inclined surfaces to arrest the action of the machine.

6. In a power transmitting and arresting mechanism, the combination with a rotary main-shaft, of means for rotating said shaft at the will of the operator and for automatically arresting the action of said shaft including oppositely arranged brake-shoes, means for actuating and for determining the time of action of the latter including a cam-disk provided with a cam lug and having rotary movements in a direction opposite to the rotary movements of said main-shaft, and rotary brake-flanges mounted concentric with the main-shaft and provided with inclined brake-surfaces with which said brake-shoes coact to arrest the transmission of power.

7. In a power transmitting and arresting mechanism, the combination with the rotary main-shaft, of means for rotating said shaft at the will of the operator and for automatically arresting the action of said shaft including rotary brake-flanges mounted concentric with said main-shaft and provided with inclined brake-surfaces, a brake spring, oppositely arranged brake-shoes, means for actuating the latter including a brake-shoe rock shaft provided with an arm manually controlled, in opposition to the resiliency of the brake-spring, to effect the transmission of power and automatically controlled to permit said brake-spring to force said brake-shoes into engagement with said inclined surfaces to arrest the action of said main-shaft, and means including a resiliently controlled catch-lever and a rotary cam-disk provided with a cam-lug for predetermining the extent of the cycle of stitch-formation.

8. In a power transmitting and arresting mechanism, the combination with a rotary main-shaft, of means for rotating said shaft at the will of the operator and for automatically arresting the action of said shaft including a band-wheel provided with a driving ring, a driving disk carried by said shaft, a resiliently controlled driving flange and a resiliently controlled brake-flange, the latter provided with an inclined brake-surface, carried by said driving disk, said flanges having lateral movements in directions transverse to their rotary movements, and means for giving to said flanges lateral movements including a second brake-flange provided with an inclined brake-surface, and oppositely arranged brake-shoes, which latter coact with said inclined brake-surfaces to arrest the action of said main-shaft, the reverse action of said brake-shoes permitting said driving-flange to be moved into driving engagement with said driving-ring to effect the transmission of power.

9. In a power transmitting and arresting mechanism, the combination with a rotary main-shaft, of means for rotating said shaft at the will of the operator and for automatically arresting the action of said shaft including a band-wheel provided with a driving ring, a driving disk carried by said shaft, a resiliently controlled driving-flange and a resiliently controlled brake-flange, the latter provided with an inclined brake-surface, carried by said driving-disk, said flanges having lateral movements in directions transverse to their rotary movements, and means for giving to said flanges lateral movements including a second brake-flange provided with an inclined brake-surface, and oppositely arranged brake-shoes, which latter coact with said inclined brake-surfaces to arrest the action of said main-shaft, the reverse action of said brake-shoes permitting said driving flange to be moved into driving engagement with said driving ring to effect the transmission of power, together with an auxiliary brake-shoe controlling mechanism including a shaft-flange carried by said main-shaft and a brake-pawl having swinging and lateral movements, the brake-action of said brake-pawl being applied to said shaft flange subsequent to the engagement of said brake-shoes with said inclined surfaces.

In testimony whereof, I have signed my name to this specification, in the presence of two subscribing witnesses.

DONALD NOBLE.

Witnesses:
E. H. WOODS,
FRANK M. WOOTTON.